US009062417B2

(12) United States Patent
Deka

(10) Patent No.: US 9,062,417 B2
(45) Date of Patent: Jun. 23, 2015

(54) METHODS OF MOLDING NON-WOVEN CARBON FIBER MATS AND RELATED MOLDED PRODUCTS

(71) Applicant: Neenah Paper, Inc., Alpharetta, GA (US)

(72) Inventor: Ganesh Deka, Roswell, GA (US)

(73) Assignee: Neenah Paper, Inc., Alpharetta, GA (US)

( * ) Notice: Subject to any disclaimer, the term of this patent is extended or adjusted under 35 U.S.C. 154(b) by 0 days.

(21) Appl. No.: 14/208,802

(22) Filed: Mar. 13, 2014

(65) Prior Publication Data
US 2014/0262088 A1 Sep. 18, 2014

Related U.S. Application Data

(60) Provisional application No. 61/784,049, filed on Mar. 14, 2013, provisional application No. 61/874,432, filed on Sep. 6, 2013.

(51) Int. Cl.
*D21H 13/50* (2006.01)
*D21H 13/24* (2006.01)
*D04H 1/4242* (2012.01)
*D04H 5/06* (2006.01)
*B29C 70/50* (2006.01)
*B29C 70/44* (2006.01)

(52) U.S. Cl.
CPC .............. *D21H 13/24* (2013.01); *D21H 13/50* (2013.01); *D04H 1/4242* (2013.01); *D04H 5/06* (2013.01); *B29C 70/44* (2013.01); *B29C 70/502* (2013.01)

(58) Field of Classification Search
CPC ....... D21H 13/50; D21H 13/10; D21H 13/36; D21H 13/14; D21H 13/16; D21H 13/24; D21H 13/26; D21H 21/18; B29C 70/40; B29C 70/44; B29C 70/443; B29C 70/502; D04H 1/4242; D04H 5/06
USPC .......... 162/141, 145–146, 149, 152, 162/157.1–157.4, 158, 164.1, 168.1, 162/204–207, 218, 135–137; 428/195.1, 428/34.2, 172, 174
See application file for complete search history.

(56) References Cited

U.S. PATENT DOCUMENTS

| 3,265,557 | A | * | 8/1966 | De Fries et al. ............... 162/138 |
| 3,336,185 | A | * | 8/1967 | Helbing ...................... 427/389.8 |
| 3,367,851 | A | * | 2/1968 | Filreis et al. .................... 205/52 |
| 3,671,385 | A | * | 6/1972 | Trent et al. .................... 162/152 |
| 3,674,621 | A | * | 7/1972 | Miyamoto et al. ............ 162/146 |
| 3,829,327 | A | * | 8/1974 | Omori et al. ................. 429/231.8 |
| 3,855,056 | A | * | 12/1974 | Maeda et al. ............... 162/157.3 |
| 3,998,689 | A | * | 12/1976 | Kitago et al. .................. 162/136 |
| 4,495,030 | A | * | 1/1985 | Giglia ........................... 162/145 |
| 4,861,653 | A | * | 8/1989 | Parrish .......................... 442/349 |
| 4,875,363 | A | | 10/1989 | Hinduja et al. |
| 5,882,517 | A | * | 3/1999 | Chen et al. ..................... 210/496 |
| 6,120,643 | A | * | 9/2000 | Levit .............................. 162/141 |
| 6,385,828 | B1 | * | 5/2002 | Kiss et al. ........................ 28/282 |
| 6,503,856 | B1 | * | 1/2003 | Broadway et al. ............ 442/366 |
| 7,314,497 | B2 | * | 1/2008 | Kahlbaugh et al. ............ 55/527 |
| 7,510,626 | B2 | * | 3/2009 | Hamada et al. ............... 162/138 |
| 7,944,401 | B2 | * | 5/2011 | Gakhar et al. ................ 343/718 |
| 8,058,194 | B2 | * | 11/2011 | Nhan et al. .................... 442/414 |
| 8,118,974 | B2 | * | 2/2012 | Nakai et al. ................... 162/141 |
| 8,172,982 | B2 | * | 5/2012 | Ales et al. ..................... 162/145 |
| 8,334,226 | B2 | * | 12/2012 | Nhan et al. .................... 442/349 |
| 8,372,242 | B2 | * | 2/2013 | Ales et al. ..................... 162/145 |
| 8,372,766 | B2 | * | 2/2013 | Nhan et al. .................... 442/414 |
| 8,381,536 | B2 | * | 2/2013 | Nhan et al. ..................... 62/109 |
| 8,580,169 | B2 | * | 11/2013 | Bell et al. ........................ 264/86 |
| 8,585,864 | B2 | * | 11/2013 | Zhang et al. .................. 162/159 |
| 8,697,934 | B2 | * | 4/2014 | Nhan et al. .................... 604/361 |
| 2003/0025231 | A1 | * | 2/2003 | Slaughter et al. .............. 264/102 |
| 2004/0086706 | A1 | * | 5/2004 | Schneider ...................... 428/323 |
| 2007/0006775 | A1 | * | 1/2007 | Helwig et al. ............. 106/287.1 |
| 2007/0246144 | A1 | * | 10/2007 | Jaffee ........................... 156/62.2 |
| 2008/0121461 | A1 | * | 5/2008 | Gross et al. .................... 181/286 |
| 2008/0145597 | A1 | * | 6/2008 | Hendren et al. ............... 428/116 |
| 2009/0036015 | A1 | * | 2/2009 | Nhan et al. .................... 442/335 |
| 2009/0176074 | A1 | * | 7/2009 | Sotendahl et al. ............ 428/208 |
| 2009/0189320 | A1 | * | 7/2009 | Bolick et al. .................. 264/511 |
| 2009/0294435 | A1 | * | 12/2009 | Nhan et al. .................... 219/553 |
| 2009/0321238 | A1 | * | 12/2009 | Nhan et al. .................... 200/5 A |
| 2010/0155006 | A1 | * | 6/2010 | Ales et al. ..................... 162/149 |
| 2011/0143110 | A1 | * | 6/2011 | Tsuchiya et al. .............. 428/213 |
| 2011/0253330 | A1 | * | 10/2011 | Zhang et al. .................. 162/124 |
| 2012/0055641 | A1 | * | 3/2012 | Nhan et al. .................... 162/125 |
| 2012/0071362 | A1 | * | 3/2012 | Nhan et al. ..................... 506/33 |
| 2012/0216973 | A1 | * | 8/2012 | Ales et al. ..................... 162/118 |
| 2013/0260123 | A1 | * | 10/2013 | Krahn et al. ................... 428/220 |
| 2014/0037878 | A1 | * | 2/2014 | Bell et al. ..................... 428/36.1 |
| 2014/0262088 | A1 | * | 9/2014 | Deka ............................. 162/146 |

FOREIGN PATENT DOCUMENTS

| EP | 0 139 193 | A2 | | 5/1985 |
| EP | 145849 | B1 | * | 7/1989 |
| EP | 483716 | A1 | * | 5/1992 |
| WO | WO 01/98064 | A2 | | 12/2001 |
| WO | WO03037481 | | * | 5/2003 |
| WO | WO 2011/007184 | A2 | | 1/2011 |

OTHER PUBLICATIONS

International Search Report for corresponding PCT Application No. PCT/US2014/025789 dated Aug. 6, 2014, 4 pages.

* cited by examiner

*Primary Examiner* — Jose Fortuna
(74) *Attorney, Agent, or Firm* — Dority & Manning, P.A.

(57) ABSTRACT

Methods for making a molded non-woven carbon fiber containing mat are provided, along with the resulting mats. Furthermore, methods are generally provided for using the molded non-woven carbon fiber containing mat to form a molded product, along with the resulting molded products.

20 Claims, 11 Drawing Sheets

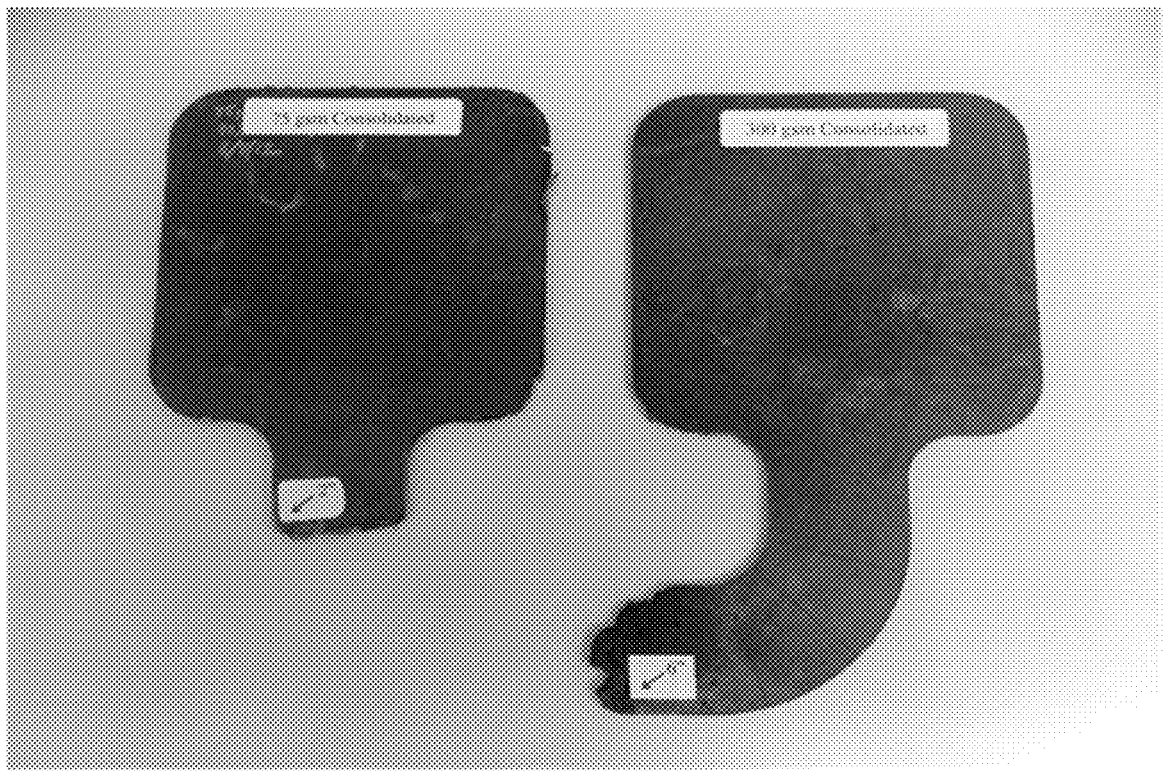
*Fig. 8A*    *Fig. 8B*

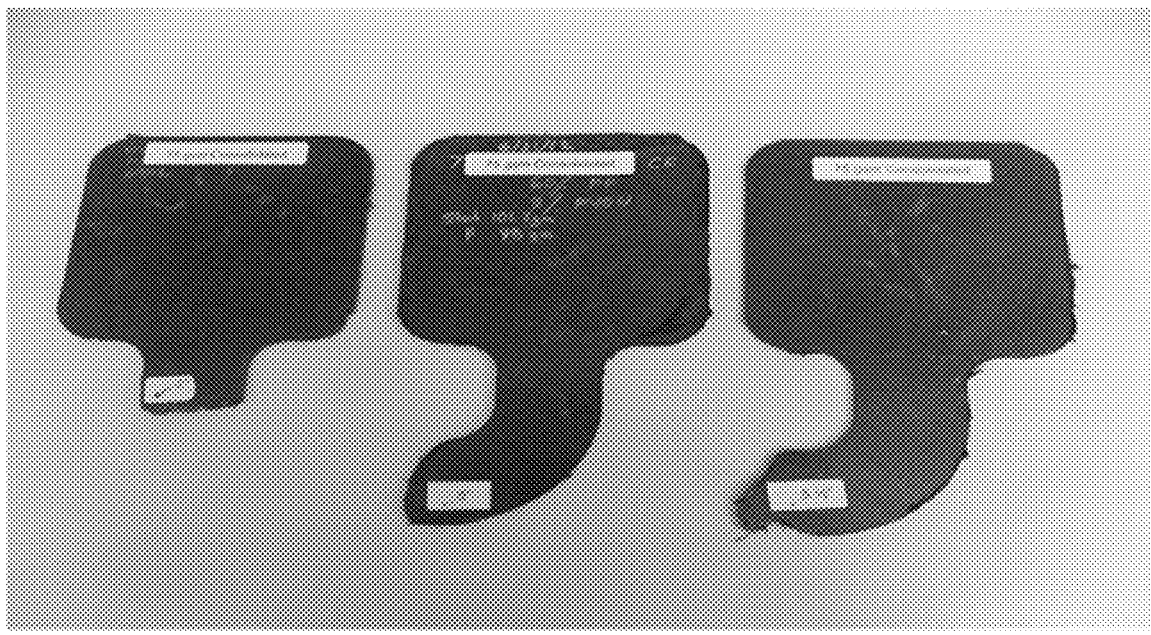
*Fig. 9A*  *Fig. 9B*  *Fig. 9C*

*Fig. 10A*     *Fig. 10B*

METHODS OF MOLDING NON-WOVEN CARBON FIBER MATS AND RELATED MOLDED PRODUCTS

PRIORITY INFORMATION

The present application claims priority to U.S. Provisional Patent Application Ser. No. 61/784,049 titled "Methods of Molding Non-Woven Carbon Fiber Mats and Related Molded Products" of Ganesh Deka filed on Mar. 14, 2013 and to U.S. Provisional Patent Application Ser. No. 61/874,432 titled "Methods of Molding Non-Woven Carbon Fiber Mats and Related Molded Products" of Ganesh Deka filed on Sep. 6, 2013, the disclosures of which are incorporated by reference herein.

BACKGROUND

Carbon fibers are widely used as reinforcements in composite material structural products. Most typically carbon fibers are combined with polymeric matrix materials through a variety of manufacturing processes and molded into structural parts used in a wide variety of applications, including airplanes, sporting goods, boats, automobiles and numerous other consumer and industrial products.

Often the carbon fibers are used to produce intermediate products such as prepregs, fabrics, molding compounds, and other product forms supplied to molders for further processing into structural components. Each of these intermediate product forms has application limitations with positive and negative attributes, with added cost to supply chain being the most negative.

Further, carbon fibers are typically produced as very large filament count tows, typically 3,000 to over 50,000 carbon filaments in a tow bundle. The carbon filaments have a diameter of approximately 7.2 microns ($10^{-6}$ millimeter) or less. The fibers and tows may be, for example, manufactured as described in U.S. Pat. No. 6,385,828 of Kiss, et al., which is incorporated herein by reference. This combination of large filament count and small filament diameter gives a very high total surface area within the carbon fiber tow which makes fully wetting these filaments with a polymeric matrix material very difficult. This complete wetting of the filaments facilitates achieving good structural properties in the composite material.

In addition, the molding step requires that this matrix flows to fill the mold cavity, and the rate at which this flow takes place is an important factor in the efficiency of the molding process, along with the resulting product.

When the fibers become longer (e.g., over 1 inch) and/or a larger number of fiber filaments group together, it becomes increasingly difficult to disperse the fibers, creating very real processing issues. In particular, the failure to uniformly disperse such filaments inhibits the flow properties of the product, which can lead to the creation of void spaces and other anomalies in the final product.

SUMMARY

Objects and advantages of the invention will be set forth in part in the following description, or may be obvious from the description, or may be learned through practice of the invention.

Methods are generally provided, in one embodiment, for making a molded non-woven carbon fiber containing mat, along with the resulting mats. Furthermore, methods are generally provided for using the molded non-woven carbon fiber containing mat to form a molded product, along with the resulting molded products.

Other features and aspects of the present invention are discussed in greater detail below.

BRIEF DESCRIPTION OF THE DRAWINGS

FIGS. 8A and 8B are photographs showing the spiral flow characterization of mats formed with 75 and 300 gsm substrates, respectively.

FIGS. 9A, 9B, and 9C show the flow characterization of mats formed with 75 gsm substrates.

FIGS. 10A and 10B show the flow characterization of mats formed with 300 gsm substrates.

DETAILED DESCRIPTION

Figure 1:
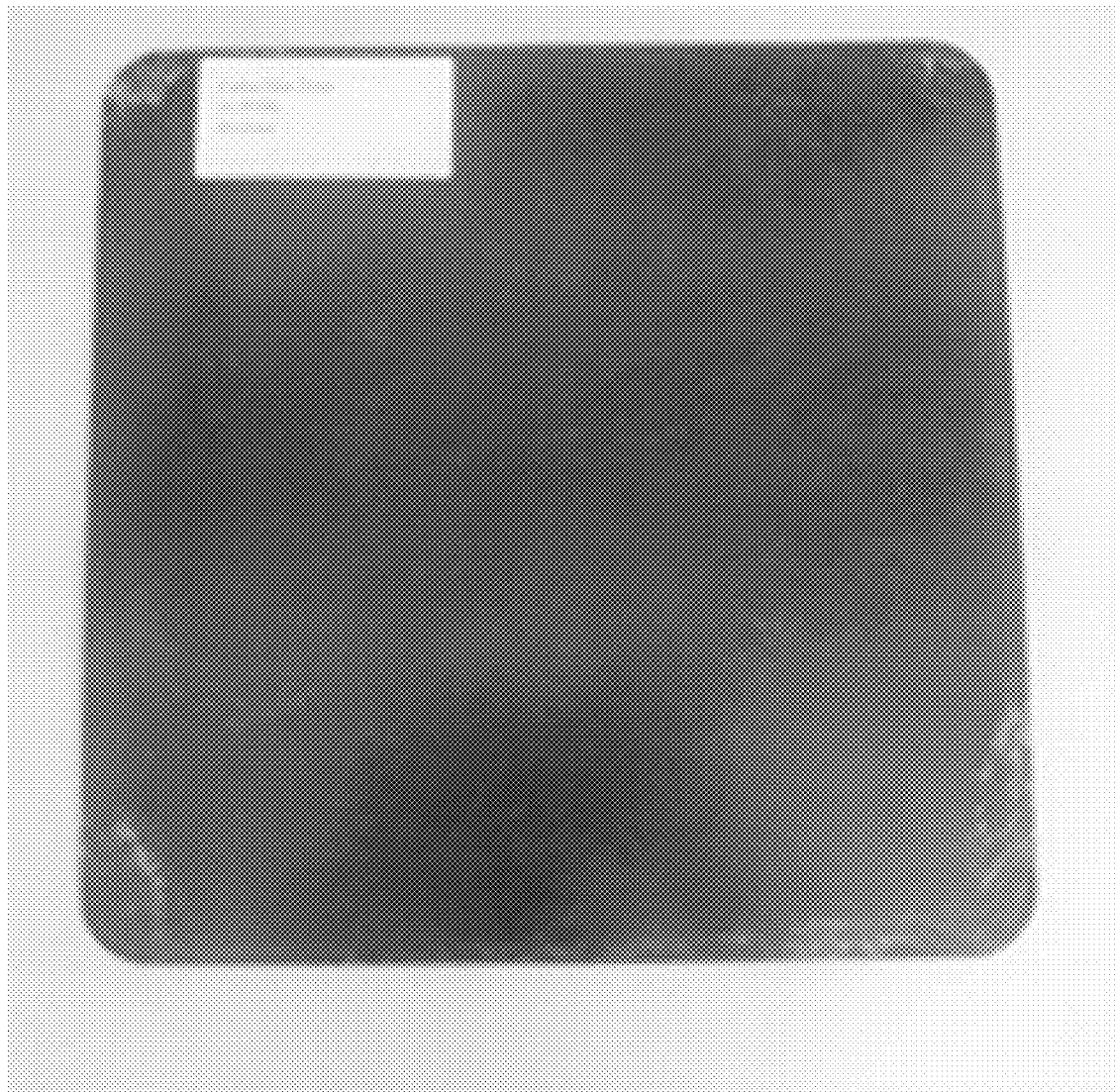
FIG. 1 is a photograph of a SMC composite made with the non-woven carbon fiber mat containing bi-component binder fibers in accordance with the invention.

Reference now will be made to the embodiments of the invention, one or more examples of which are set forth below. Each example is provided by way of an explanation of the invention, not as a limitation of the invention. In fact, it will be apparent to those skilled in the art that various modifications and variations can be made in the invention without departing from the scope of spirit of the invention. For instance, features illustrated or described as one embodiment can be used on another embodiment to yield still a further embodiment. Thus, it is intended that the present invention cover such modifications and variations as come within the scope of the appended claims and their equivalents. It is to be understood by one of ordinary skill in the art that the present discussion is a description of exemplary embodiments only, and is not intended as limiting the broader aspects of the present invention, which broader aspects are embodied exemplary constructions.

Methods of molding nonwoven carbon fiber mats are generally provided, along with the resulting molded products. The molded carbon fiber mat is particularly useful as a reinforcement material in sheet molding compounds. In one embodiment, a wet-laid, non-woven mat material is provided that generally includes a plurality of carbon reinforcement fibers and a plurality of binder fibers. The molded carbon fiber mat generally has an open, substantially uniform network of the carbon reinforcement fibers stabilized by binder fibers within the mat. As such, the resulting carbon fiber mat provides excellent mold flow properties for downstream molding processes.

The product formed can be a thermoset nonwoven carbon fiber mat or a thermoplastic nonwoven carbon fiber mat, depending on the components and method utilized to make the mat. Both embodiments (i.e., the thermoset nonwoven carbon fiber mat and the thermoplastic nonwoven carbon fiber mat) are discussed in greater detail below.

I. Thermoset Nonwoven Carbon Fiber Mat

In one embodiment, a method of making a thermoset nonwoven carbon fiber molded mat is generally provided. The method includes forming (e.g., via mixing) an aqueous slurry with a combination of carbon fibers and binder fibers in water. For example, the aqueous slurry can include, in certain embodiments, about 0.2% to about 10% by weight (based on the weight of the slurry of a plurality) of carbon fibers and about 1% to about 10% by weight (based on the weight of the slurry) of a plurality of binder fibers.

Additional components may also be included in the aqueous slurry, as desired. For example, a viscosity modifier can be added to the water forming said aqueous slurry, either before, concurrent with, or after the other components are added to form the slurry. In one embodiment, a two component system of surfactant and flocculant may be used in said viscosity modification step of the slurry.

A. Carbon Fibers

Carbon fibers that may be used include fibers made entirely from carbon or fibers containing carbon in amounts sufficient so that the fibers provide desired structural properties such as tensile strength, modulus and flexural strength. For example, carbon fibers may be used that are formed from a polyacrylonitrile polymer. In particular embodiments, the carbon fibers may be formed by heating, oxidizing, and carbonizing polyacrylonitrile polymer fibers. Such fibers typically have high purity and contain relatively high molecular weight molecules. For example, the fibers can contain carbon in an amount greater than about 85% by weight (e.g., about 85% to 100%), such as greater than about 88% by weight, such as greater than about 90% by weight, such as in an amount greater than 92% by weight, such as in an amount greater than about 95% by weight.

Of particular advantage, the formed carbon fibers can be chopped to any suitable length. In one aspect, for example, chopped carbon fibers may be incorporated into the aqueous slurry having a length of from about 1 mm to about 37 mm, such as from about 3 mm to about 6 mm. Such fibers can have an average diameter of from about 3 microns to about 15 microns, such as from about 5 microns to about 10 microns. In one particular embodiment, the chopped carbon fibers may be incorporated into the aqueous slurry having a length of from about 15 mm to about 37 mm, such as about 20 mm to about 35 mm. For example, the carbon fibers may have a length of about 25 mm and an average diameter of about 7 microns. Carbon fibers are described in detail in, for example, in U.S. Pat. No. 6,385,828 and U.S. Pat. No. 4,861,653, which are incorporated herein by reference in their entirety.

The carbon fibers can be virgin fibers or recycled fibers. In the market, there are a several different types of recycled fibers. However, most of these recycled fibers are coming from materials left in spools or waste from production (clippings). However, most of the materials are from pyrolysis or solvolysis.

B. Binder Fibers

Due to the non-bonding characteristics of carbon fibers, some form of binder material is included to inter-connect or provide network support for carbon fibers in forming the dried mat product. The selection of a binder is important in making a mat with good mold flow properties. The substrate must have enough structural integrity to hold together during web forming, handling and processing prior to being resin impregnated. However, once combined with a resin (such as a sheet molding compound), a loose fiber network is desirable to ensure flow during the molding process. When impregnated with the resin, such binders should also allow fiber network bond sites to collapse or decouple allowing fibers to flow as a network in the molding process.

In one particular embodiment, the binder fibers are generally non-adhesive in that permanent bonding does not occur. Instead, the carbon fibers are held by melt bonds that are subject to release and reforming during the molding step, thereby resulting in improved mold flow. The binder fibers can also be flexible under mat forming conditions and entrap the carbon fibers without locking them in place by permanent, i.e., non-melting, adhesive bonding. This feature permits rapid flow of the matrix under conditions of molding. The term "non-adhesive" means, as used herein, that the multi-component binder fibers are capable of forming melt attachments to carbon fibers that can be released in the molding step(s) by re-melting and thereby improve melt flow and subsequently reform after the molding step(s) and in the final molded product. It has been discovered that the use of non-adhesive, multi-component binder fibers provide enhanced inter-connection of the carbon fibers and faster flow properties in the molding process. In one particular embodiment, the binder fibers include thermoplastic multi-component binder fibers (e.g., bi-component binder fibers).

In one embodiment, the binder fibers are multi-component binder fibers, such as in the form of bicomponent polymer fibers, tricomponent polymer fibers, or other variations. The bicomponent fibers may be arranged in a sheath-core, side-by-side, islands-in-the-sea, or segmented-pie arrangement. In one particular embodiment, the bicomponent fibers are formed in a sheath-core arrangement in which the sheath is formed of a first polymer that substantially surround a core formed of a second polymer. That is, the sheath is constructed from a first polymeric material, and the core is constructed from a second polymeric material, with the first polymeric material being different than the second polymeric material. In bicomponent polymer fiber with a sheath-core arrangement, it is not required that the sheath totally surround the core.

In a particular embodiment, the first polymeric material (i.e., the surface component) has a melting point lower than the melting point of the second polymeric material (i.e., the core component) so that upon heating the bicomponent fibers to a temperature above the melting point of the first polymeric material and below the melting point of the second polymeric material, the first polymeric material will soften or melt while the second polymeric material remains intact. In one embodiment, the surface component (e.g., the first polymeric material that forms the sheath) has a melting point within the range of the mat processing conditions to allow it to soften and flow at the mat processing conditions. However, the core component (e.g., the second polymeric material that forms the core) has a melting point above the range of the mat processing conditions to allow it to remain substantially intact at the mat processing conditions.

Numerous combinations of materials can be used to make the bicomponent polymer fibers, such as, but not limited to, combinations using polyester, polypropylene, polysulfide, polyolefin, and polyethylene fibers. Specific polymer combinations for the bicomponent fibers include polyethylene terephthalate/polypropylene, polyethylene terephthalate/ polyethylene, and polypropylene/polyethylene. Other non-limiting bicomponent fiber examples include copolyester polyethylene terephthalate/polyethylene terephthalate (co-PET/PET), poly 1,4 cyclohexanedimethyl terephthalate/polypropylene (PCT/PP), high density polyethylene/polyethylene terephthalate (HDPE/PET), high density polyethylene/polypropylene (HDPE/PP), linear low density polyethylene/polyethylene terephthalate (LLDPE/PET), nylon 6/nylon 6,6 (PA6/PA6,6), and glycol modified polyethylene terephthalate/polyethylene terephthalate (6PETg/PET).

The bicomponent polymer fibers may have a denier of from about 1-18 denier and a length of from 2-12 mm. In one embodiment, the first polymer (surface component) has a melting point within the range of from about 150 to 400° F., or in the range of from about 170 to 300° F. The second polymer (core component) has a higher melting point, for example, above about 350° F.

The surface component(s) of the binder fibers are selected so as to soften and lend flexibility to entrap carbon fibers but not to the extent that permanent adhesive attachment occurs and the permanently attached carbon fibers are locked in place by adhesive bonds under the mat forming conditions.

Multi-component fibers are available in many different combinations and may be selected with the above parameters in mind. Additional characteristics include fiber length and diameter. Generally, useful multi-component fibers have lengths broadly within the range of from about 3 mm to about 20 mm, for some embodiments from about 6 mm to about 12 mm and diameters within the range from about 1.5 dpf to about 4 dpf, for some embodiments within the range of from about 2 dpf to about 3 dpf.

In one embodiment, the binder fibers may be present in the aqueous suspension in an amount of at least about 2% by weight based upon the weight of all fibers present and up to about 10%, for example within the range of from about 2% to about 4%.

C. Wet-Laid Mat

The slurry can be deposited onto a porous forming surface to form a supported wet-laid mat. Water can be then removed (e.g., drained) from the wet-laid mat through the porous forming surface.

The open network within the mat is formed during the wet laid process of the aqueous suspension/slurry. As the wet mat is drained through the porous forming surface, it may form a gradient structure because of draining from one direction and compacting as the mat is formed. In one embodiment, a size coating may be applied by curtain or other coating means to improve wet-out of fibrous mat, and therefore reduce void volume in the final product.

In one embodiment, the plurality of carbon fibers are substantially aligned after the wet laid process, due to the typical fiber alignment of cellulose or synthetic fibers in a wet laid web and have more fibers oriented in one direction than in any other directions.

The liquid (e.g., water and any other solvents present) can be removed via suction-assisted draining through the porous forming surface, via pressing, etc.

In one embodiment, the method further includes a step of applying a sizing agent coating fibers of said wet-laid mat prior to activating said multi-component binder fibers. Manipulation of the wet-laid process can determine the ultimate degree of dispersion and thus placement of the fiber as an individual filament or as a tow bundle. In order to control fiber placement and entanglement, the dispersion of the cluster of fiber tows can be manipulated by adding a dispersing aide such as a flocculant. A non-limiting example of a suitable flocculant is Nalclear 7768 ethoxylated alcohol from Nalco.

Further enhancement may be obtained by also adding a surfactant. A non-limiting example of a suitable surfactant is Nalco 8493. The flocculant and the surfactant may each be used in amounts commonly associated with wet-laid processes. In one embodiment, the flocculant and the surfactant may each be added in an amount within the range of about 0.02% to about 0.04%, or about 0.005% to about 0.006%, based on the total weight of the suspension. Without these additives, the carbon fibers have a greater tendency to be clumped together as bundles.

In one embodiment, a dispersant may first be added to the white (slurry) water at about 600-800 ppm with substantial mixing energy. An example of a suitable dispersant is Nalco 8493 from Nalco Company, Naperville, Ill. A high molecular weight anionic flocculant, such as Nalclear 7768 from Nalco Company, may then be added to maintain the white water viscosity at about 5 to about 10 cps Brookfield at 21° C. measured with #2 spindle at 30 rpm.

By adding to the water a dispersant, flocculant and/or surfactant additives and mixing of the carbon fibers under very low agitation, dispersed fibers with minimal clumping can be obtained. The dilution water used for carbon fiber supplied to the forming unit also may be adjusted in the same manner, with the provision that increased viscosity may at some addition level adversely impact the drainage characteristics of the mat to be formed.

Other additives may be included in the aqueous suspension provided such additives in the chosen amounts are not detrimental to the carbon fiber matrix. Non-limiting examples of such additives include additional dispersants, surfactants, antioxidants, anti-foamers, bactericides, oxidation absorbers, thickeners, softeners, hardners, UV stabilizers, and colorants.

The ability to control the fiber orientation allows for the specific tailoring of the mechanical properties of the resulting mat. Specifically, control of fiber orientation allows the mat to be tailored to the application and to the specific process.

D. Activating the Binder Fibers

After wet laying the aqueous slurry and removing at least a portion of the liquid, the binder fibers are activated to form a melt attachment between the surface of the binder fibers and the carbon fibers in the wet-laid mat. The binding fibers can then be activated by heating to a temperature at or above the melt softening temperature point whereby the binder fibers form a melt attachment to the carbon fibers at contact points between the carbon fibers and the binder fibers.

For example, when the composition of the bicomponent sheath-core binder fiber discussed above, the surface component (e.g., the first polymeric material of the sheath) is melted to melt bond to the carbon fibers. While the heat applied is sufficient to melt the first polymeric material of the sheath (e.g., at or above the melt temperature of the first polymeric material), the heating temperature is less than the melting point of the second polymeric material of the core to ensure that the binder fibers substantially retain their integrity. In one embodiment, infra-red heating can be utilized to activate the binder fibers. For example, when composed of a multi-component fiber, the binder fibers can be heated to a temperature generally at or above the melting point of the surface component to form melt bonds with the carbon fibers.

To initially melt the surface component(s) of the non-adhesive multi-component binder fibers, the mat may be placed on the surface of a rotating heated Yankee dryer and dried. Alternatively, the mat may be placed on a through air dryer with hot air passing through the mat. In accordance with a preferred embodiment of the present disclosure, the mat is dried on a flat wire with hot air being passed through the mat. In a further aspect, drying may be a two-step process, for example using infra-red heating immediately after mat formation so as to initially melt the surface component(s) of the multi-component binder fibers prior to final drying. For example, leaving the porous draining surface, water content may be reduced to less than 30% and less than about 2% after final drying.

The open uniform network morphology provides for very easy impregnation of the mat with polymeric or other composite matrix materials and easy wetting of individual filaments. This in turn leads to excellent mechanical and other physical properties of the composite with very high fiber property translation into the composite structure. The ease of impregnation leads to higher speed/lower cost downstream processing, thus leading to lower cost structural components. The open network morphology also allows impregnation with powder matrix materials and high viscosity liquid matrix materials that are typically difficult or impossible to achieve with other carbon fiber products and processes.

The open network morphology of the mat product and unique processing allow for several distinguishing features. One feature is the ability to control the mat physical and mechanical properties. The unique ability to control the fiber orientation allows for the specific tailoring of the mechanical properties of the mat. Specifically, it allows the mat to be tailored to the application and to the specific process. Another feature is the open uniform fiber network morphology.

Further drying the wet-laid mat forms a non-woven carbon fiber mat having an open uniform network of carbon fibers maintained in substantial alignment by the activated binder fibers. That is, further drying the wet-laid mat forms a non-woven carbon fiber mat having an open uniform network of carbon fibers substantially maintained in position by the melt bonding multi-component fibers without permanent adhesive bonding between the carbon fibers and multi-component fibers. At this stage, the carbon fibers are entrapped in the mat, but not locked in place by any permanent adhesive bonds.

E. Impregnated, Non-Woven Carbon Fiber Mat

A carbon fiber reinforced composite can then be made by preparing a non-woven carbon fiber mat (as discussed above, including carbon fibers and non-adhesive, multi-component binder fibers); impregnating the non-woven carbon fiber mat with a resin; and molding the resin impregnated non-woven carbon fiber mat to form a carbon fiber reinforced composite. In this embodiment, the multi-component fibers may be selected with a surface component that is compatible with the impregnating resin to further facilitate the molding step. For example, molding can be achieved by flowing the non-woven carbon fiber mat into a mold cavity (e.g., completely filling a mold cavity). As such, the impregnated mat can be subjected to vacuum assisted resin transfer conditions to cause mold flow and form a molded product; followed by subjecting the dried wet-laid mat to temperature, pressure and/or vacuum assisted resin transfer conditions re-melting at least the binder fiber surface component(s) to form a molded product.

The open and uniform network morphology of substrates provides very easy impregnation with polymeric or other composite matrix materials and easy wetting of individual filaments particularly where the multi-component binder fibers have a surface component that is compatible with the impregnating resin. By compatible it is meant that with the curing system employed for use with a thermosetting resin matrix, the surface component(s) of the multi-component binder fibers, co-cure with the matrix forming bonds that result in enhancing physical and other properties. In many embodiments, the resin and surface component(s) have similar chemical structures and/or properties and result in little or no observable remaining binder particles as contaminant after the molding step. An example includes a CoPET/PET bicomponent binder fiber and unsaturated polyester impregnating resin. Another example is the use of a vinyl ester or polyester in combination with similar vinyl ester or polyester containing multi-component binder fibers.

The impregnating resin may be selected from a wide variety of compositions depending on the desired properties of the molded product as will be apparent to those skilled in the art of molding such products. For molded products of the type described above, frequently the resin will be selected from thermoset resins such as epoxy and vinyl ester compounds, for example, in addition to the unsaturated polyester resins mentioned above. The amount of saturant used will also be determined by the properties desired in the molded product but may, for example, be within the range of from about 30% to about 55% or in certain embodiments from about 40% to about 50%, based on the volume of the impregnated mat.

The open network morphology and ease of impregnation proves very useful for downstream applications such as SMC compounding and compression molding. Additional features of the carbon fiber mat include control of the surface finish of the final product, and efficient fiber translation into composite structures.

In one embodiment, multiple layers of the impregnated, wet-laid mats can be combined prior to subjecting them to the conditions for molding.

In the resulting mat, the binder fibers can be about 1% to about 5%, by weight, of the final product (e.g., about 2% to about 4% by weight).

II. Thermoplastic Nonwoven Carbon Fiber Mat

In another embodiment, the molded non-woven carbon fiber containing mat can be formed from an aqueous slurry comprising carbon fibers, thermoplastic polymeric fibers, and binder fibers. The carbon fibers and the binder fibers can be independently selected from those discussed above. Additional components, as discussed above, can also be included in the aqueous slurry.

In this embodiment, the binder fibers can be present in an amount of about 0.5% to about 5% by weight based on the weight of the slurry; the carbon fibers can be present in an amount of about 10% to about 90% by weight based on the weight of the slurry; and the thermoplastic fibers can be present in an amount of about 10% to about 90% by weight based on the weight of the slurry. Suitable thermoplastic fibers for use in this embodiment can include nylon, a polyolefin, a polyamide (e.g., PA6, PA66), polyphenylenesulfide (PPS), a polyetheretherketone (PEEK), a polyetherimide (PEI), or mixtures thereof.

This aqueous slurry can then be deposited onto a porous forming surface (as discussed above) to form a wet-laid mat supported by the porous forming surface, and at least a portion of the water can be removed from the wet-laid mat through the porous forming surface.

Then, the wet-laid mat can be heated to a flow temperature such that the thermoplastic polymeric fibers melt. This flow temperature is, in one embodiment, above the melting point of the thermoplastic polymer material of the thermoplastic fibers, but below the melting point of the binder fibers. For example, when formed from bi-component fibers having a first polymeric material with a first melting temperature forming the sheath and a second polymeric material having a second melting temperature forming the core, the flow temperature can be below the first melting temperature and/or the second melting temperature. As such, at the flow temperature, the thermoplastic fibers generally melt and flow, while the binder fibers (and the carbon fibers) substantially retain their integrity.

The wet-laid mat, can then flow, while at the flow temperature, into a mold where it can then be subjected to heat and pressure to activate the binder fibers. After cooling, the wet-laid mat within the mold a molded non-woven carbon fiber containing mat remains.

In the resulting mat, the binder fibers can be about 1% to about 5%, by weight, of the final product (e.g., about 2% to about 4% by weight).

EXAMPLES

Example 1

A carbon fiber mat is made using a wet-laid process. CMC 7H (carboxy methyl cellulose Aqualon 7H) in an amount of 0.1 wt %, based on the total weight of the water/CMC mixture, is initially dispersed in warm water (95° F.-100° F.) to raise the viscosity of water to 40 cps. Carbon fibers [Zoltek carbon fibers/size 25 mm/7.8 microns] in an amount of 97 wt % and 3.0% by weight bi-component (amorphous CoPET/PET) fibers T201 from Fiber Innovation Technology, Inc., Johnson City, Tenn., 2.2 dtex, 6 mm having a 110° C. melting sheath are dispersed in the water containing CMC. The resulting slurry is deposited on a porous surface to form a supported wet-laid mat. The water is drained from the wet-laid through the porous surface. The bi-component binder fibers are activated by heating to a temperature of about 110° C. to form melt attachments to the carbon fibers at the contact points between the carbon fibers and the binder fibers. The wet-laid mat is saturated with water based polyurethane (1% solution, Hydrosize U6-01 aqueous polyurethane solution from Michelman, Cincinnati, Ohio) to facilitate sizing the carbon fibers for subsequent resin wet-out. The wet-laid mat is further dried to form a non-woven carbon fiber mat having an open uniform network of carbon fibers. The carbon fibers are stabilized in the network by the binder fibers.

Comparative Example 2

A wet-laid carbon fiber mat is prepared substantially in accordance with the method of Example 1, with the exception that the binder fibers are 3.7% by weight of polyvinyl alcohol fiber VPB 105-2, 4 mm with dissolving temperature of 60° C. in water and the binder is activated at a temperature of about 62° C.

Comparative Example 3

A wet-laid carbon fiber mat is prepared substantially in accordance with the method of Example 1, with the exception that the binder fibers are 7.2% by weight of polyvinyl alcohol fiber VPB 105-2, 4 mm with dissolving temperature of 60° C. in water and the binder is activated at a temperature of about 62° C.

Example 4

The carbon fiber mat of Example 1 is resin impregnated into a sheet molding compound using a standard plaque mold. The mat is resin impregnated with a filled unsaturated polyester resin system compatible with the bi-component binder fibers and molded at 1000 psi at 295° F. for 2 minutes. The resin formulation used is a hybrid unsaturated polyester/urethane resin that includes a filler to control viscosity, as follows:

| Ingredient | Description | Parts (wt.) |
| --- | --- | --- |
| Dion ®31638[1] | Unsaturated polyester polyol | 75 |
| 500-75P[2] | Peroxide initiator | 1 |
| PBQ 12.5[3] | P Benzoquinone inhibitor | 0.15 |
| ACF[4] | Zinc stearate, mold release | 4 |
| W-4[5] | Calcium carbonate filler | 50 |
| Dion ®31110[1] | Diphenylmethane diisocyanate | 22.5 |

[1]Available from Reichhold, Inc., Durham, NC
[2]Available from Syrgis Performance Initiators, Helena, Arkansas
[3]Available from Plastics Color Corporation, Calumet City, Il
[4]Available from Ferro Corporation, Mayfield Heights, OH
[5]Available from J.M. Huber Corporation, Edison, NJ The carbon fiber mat is wetted out with the above resin system targeting a 35% (i.e. ratio of 65/35 or 1.857) carbon fiber weight or approximately 30% fiber volume. Sheets are cut 10" square for wetting out and molding in 12"×12" with mold coverage of 69.4%.

Dry weight of carbon fiber mat=182 grams (made with 25 mm chopped carbon fibers with 3% bi-component T201 PET/CoPET fibers.

For wetting out, 15% excess resin is used=182×1.857× 1.15=388 grams FIG. 1 shows the flow characteristics of the carbon fiber mat of Example 1 used to produce the SMC compound of Example 4.

Comparative Example 5

The carbon fiber mat of Comparative Example 2 is resin impregnated into a sheet molding compound using a standard plaque mold substantially in accordance with the process of Example 4.

Dry weight of carbon fiber mat=213 grams (made with 25 mm chopped carbon fiber with 3.7% PVOH VPB 105-2 4 mm as binder fibers)

Figure 2:
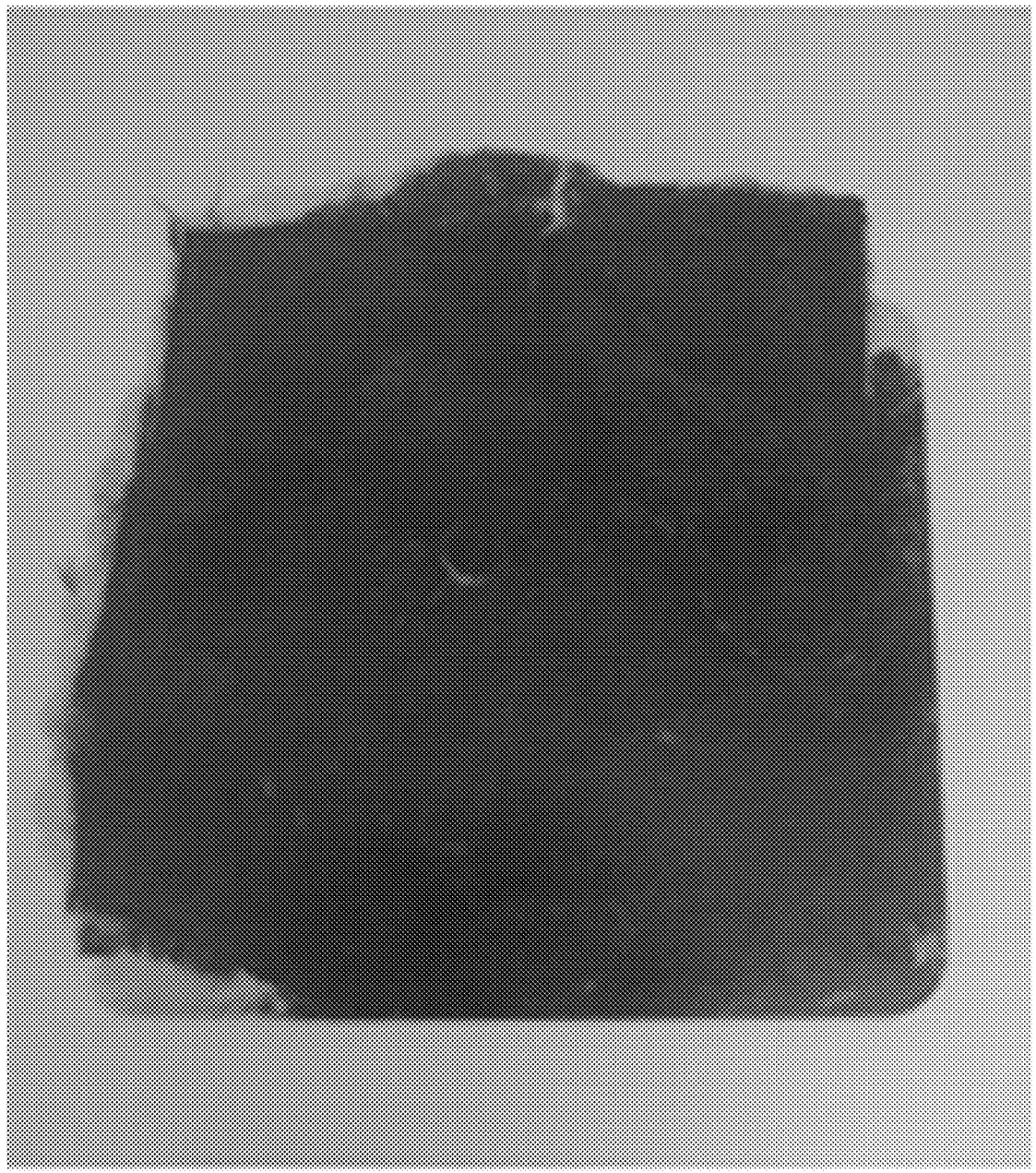
FIG. 2 is a photograph of a SMC composite made with a comparative non-woven carbon fiber mat containing 3.7% PVOH binder fibers.

For wetting out, 15% excess resin was used=213×1.857× 1.15=454 grams FIG. 2 shows the flow characteristics of the carbon fiber mat of Comparative Example 2 used to produce the SMC compound of Comparative Example 5.

Comparative Example 6

The carbon fiber mat of Comparative Example 3 is resin impregnated into a sheet molding compound using a standard plaque mold substantially in accordance with the process of Example 4.

Dry weight of carbon fiber mat=197 grams (made with 25 mm chopped carbon fibers with 7.2% PVOH VPB 105-2 4 mm as binder fibers)

Figure 3:
FIG. 3 is a photograph of a SMC composite made with a comparative non-woven carbon fiber mat containing 7.2% PVOH binder fibers.

For wetting out, 15% excess resin used=197×1.857× 1.15=420 grams FIG. 3 shows the flow characteristics of the carbon fiber mat of Comparative Example 3 used to produce the SMC compound of Comparative Example 6.

Observations of Wetting Out and Molding, Examples 1-6:

In the production of sheet molding compounds, it is desirable that the reinforcing carbon fibers contact the polymeric matrix material. A measure of this contact is referred to as wetting, which is a measure of how well the carbon fibers are encapsulated by the matrix material.

The carbon fiber mat of Comparative Example 2: wet only on surfaces, and was very dry. The sheets were cross plied at 90° to each other to equalize fiber direction.

The carbon fiber mat of Example 1: dry centers but less than that of Comparative Example 2. However, the mold is filled 100% with an acceptable appearance and clearly shows improved flow using bi-component binder. This can be quantified using weight and/or photographic measurement. As a further demonstration, wet out samples of Example 1 were cut in 10" round instead of 10" square and it is observed that even with round samples, the mold fills up completely.

The carbon fiber mat of Comparative Example 3: Two corners not filled, one carbon fiber high spot. High resin flow compared to fiber flow. About 95% full.

Comparing the flow characteristics in a standard plaque mold, it can therefore be indicated that the type of binder used for making a carbon fiber substrate has significant influence on the flow characteristics of a fiber matrix. It has been shown that the use of non-adhesive, multi-component binder fibers for making a carbon fiber substrate affects mold flow characteristics of a carbon fiber matrix. The compatibility between the multi-component binder fibers and the resin used to impregnate the mat is a significant factor. For example, it has been found that use of EVNPP or HDPE/PP bicomponent binder fibers with the resin described in the above examples resulted in the bicomponent binder fibers remaining as contaminants in the mold compound.

Example 7

The carbon fiber mat of Example 1 is resin impregnated into a sheet molding compound using a spiral flow mold device of the type described in U.S. Pat. No. 4,875,363, incorporated herein in its entirety (SmarTrac® Model sensor from Signature Control Systems, Inc., Littleton, Colo. 80127). In the spiral flow tool, the mold has a 6" square loading area and a 2" wide channel that is 48" long for a relative flow measurement. It is a compression mold with shear edges and can mold plaques up to 0.75" thick. Molding pressure can be varied to control flow in part. A sample of the carbon fiber mat cut to 5 in.×5 in. is resin impregnated with the filled unsaturated polyester resin system described above, and molded at 1000 psi at 295° F. for 2 minutes.

Figure 4:
FIG. 4 is a photograph of a SMC composite made using a spiral flow mold with the non-woven carbon fiber mat containing bi-component binder fibers in accordance with the invention.

FIG. 4 shows the flow characteristics of the carbon fiber mat of Example 1 in the spiral flow mold used to produce the SMC compound of Example 7.

Comparative Example 8

Figure 5:
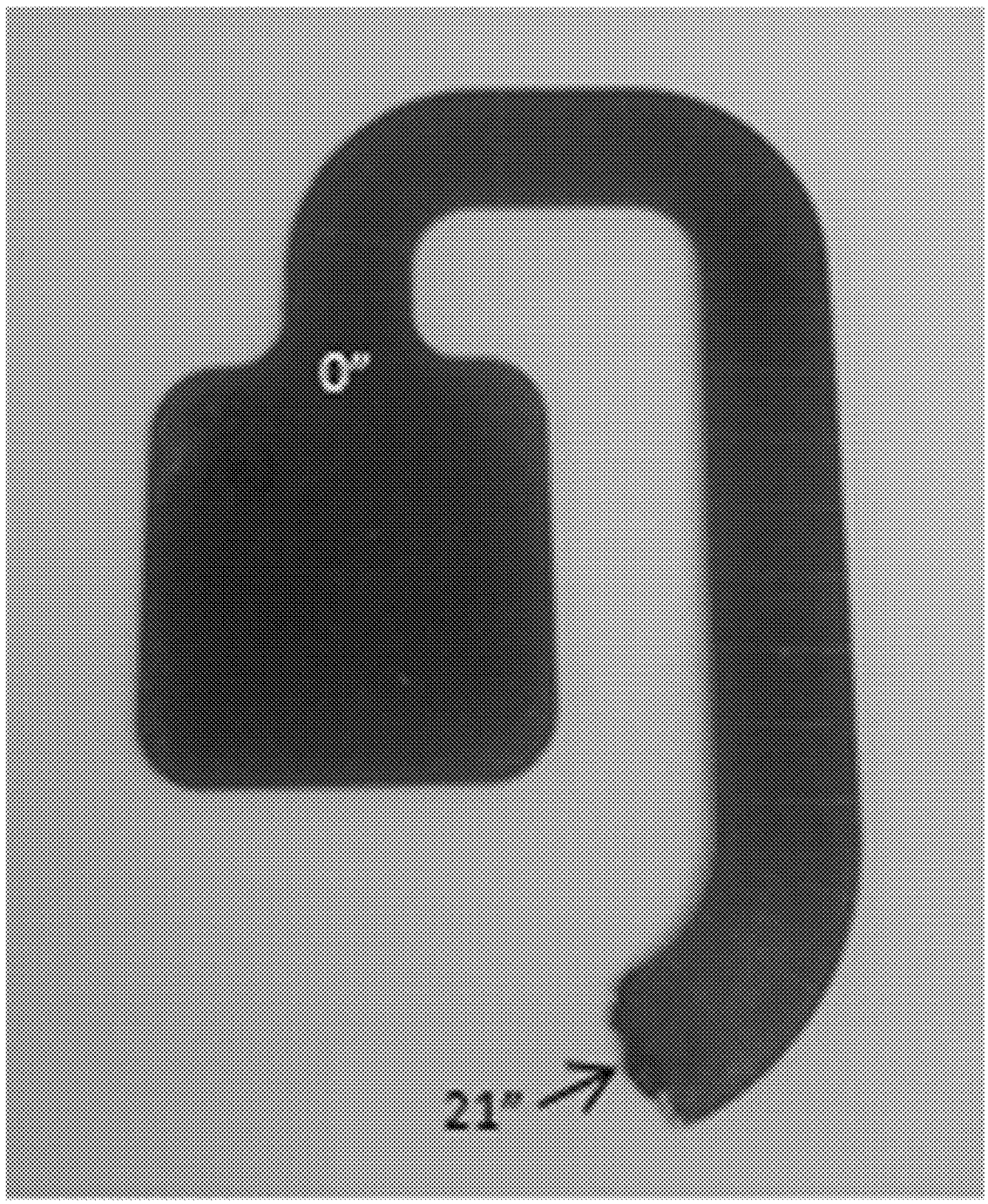
FIG. 5 is a photograph of a SMC composite made using a spiral flow mold with a comparative non-woven carbon fiber mat containing 3.7% PVOH binder fibers.

The carbon fiber mat of Comparative Example 2 is resin impregnated into a sheet molding compound using a spiral flow mold device substantially in accordance with the process of Example 7. FIG. 5 shows the flow characteristics of the carbon fiber mat of Comparative Example 2 in the spiral flow mold used to produce the SMC compound of Comparative Example 8.

Comparative Example 9

Figure 6:
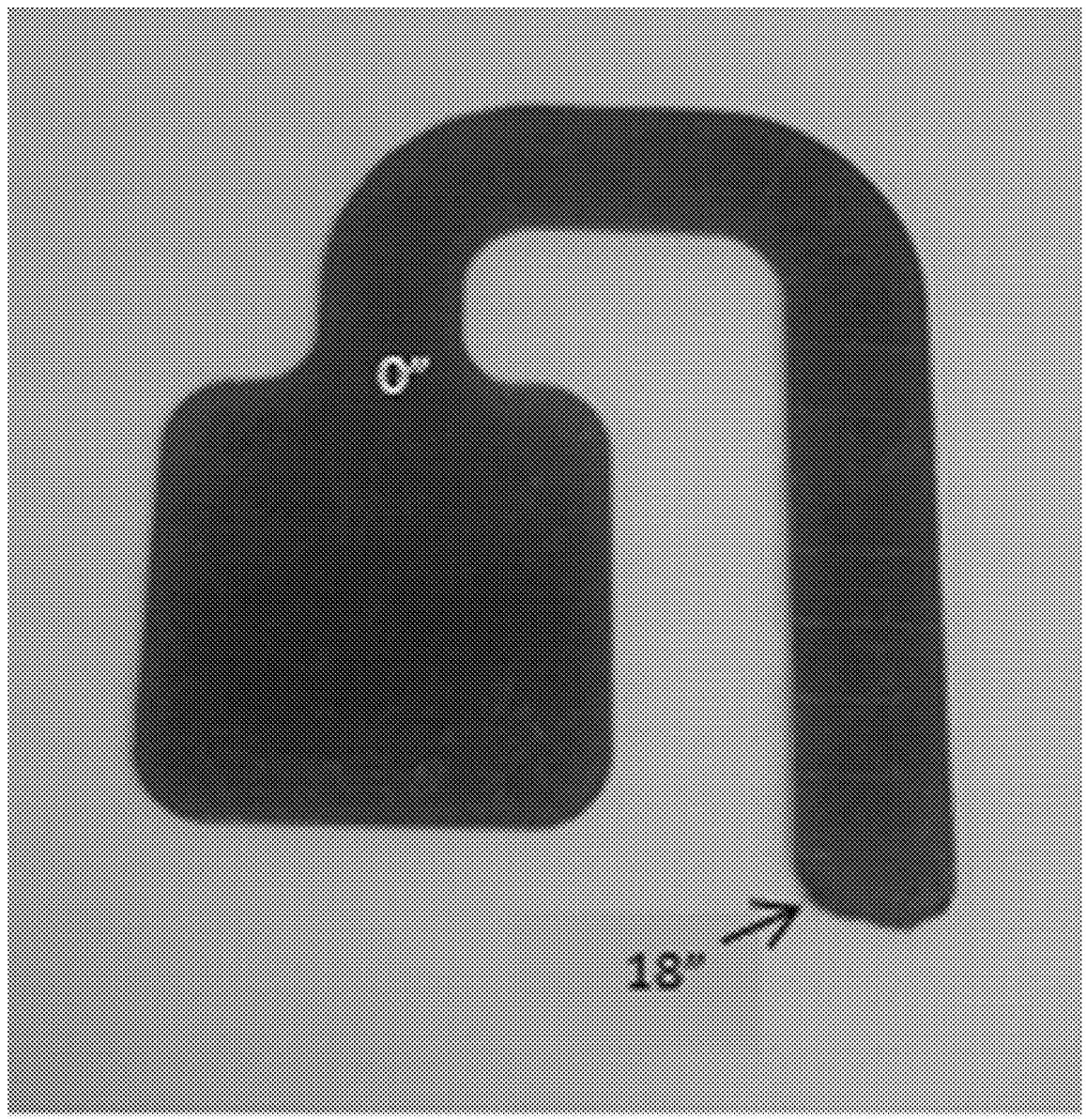
FIG. 6 is a photograph of a SMC composite made using a spiral flow mold with a comparative non-woven carbon fiber mat containing 7.2% PVOH binder fibers.

The carbon fiber mat of Comparative Example 3 is resin impregnated into a sheet molding compound using a spiral flow mold device substantially in accordance with the process of Example 7. FIG. 6 shows the flow characteristics of the carbon fiber mat of Comparative Example 3 in the spiral flow mold used to produce the SMC compound of Comparative Example 9.

As demonstrated by FIGS. 5 and 6, with the carbon fiber mat containing 3.7% PVOH binder, the resin material flowed approximately 21.0 inches, while with the carbon fiber mat containing 7.2% PVOH binder, the resin material flowed 18.0 inches. This indicates a restriction of flow because of increased binder level. FIG. 4 represents the flow characterization with the bi-component polyester binder, which has the highest flow It has been shown that another way to influence flow is by controlling the viscosity of the resin formulation. Unexpectedly, it was discovered that within certain parameters, increasing the viscosity of the resin actually improves flow. While the mechanism is not entirely clear, it is believed that higher viscosity resin aids the movement of the carbon fibers.

Example 10

The same resin system described above is used to impregnate the carbon fiber mats. For unfilled system, the calcium carbonate filler (W-4) was excluded from the resin formulation. Wetted out samples are cut 4.5 in. square to charge the spiral flow system and in both conditions, the resin charge is 228 grams. Testing is done at 295° F. and at 1000 psi. In the filled system, the charge was found to flow 15.5 inches whereas in unfilled system, the charge flowed 13.5 inches. Viscosity of the resin is measured using a Brookfield Engineering Laboratories, Middleboro, Mass. Model HB, viscometer with T-bar Spindle A at 10 rpm. Viscosity of the filled resin system is 560 cps whereas unfilled system is 450 cps.

Figure 7A:
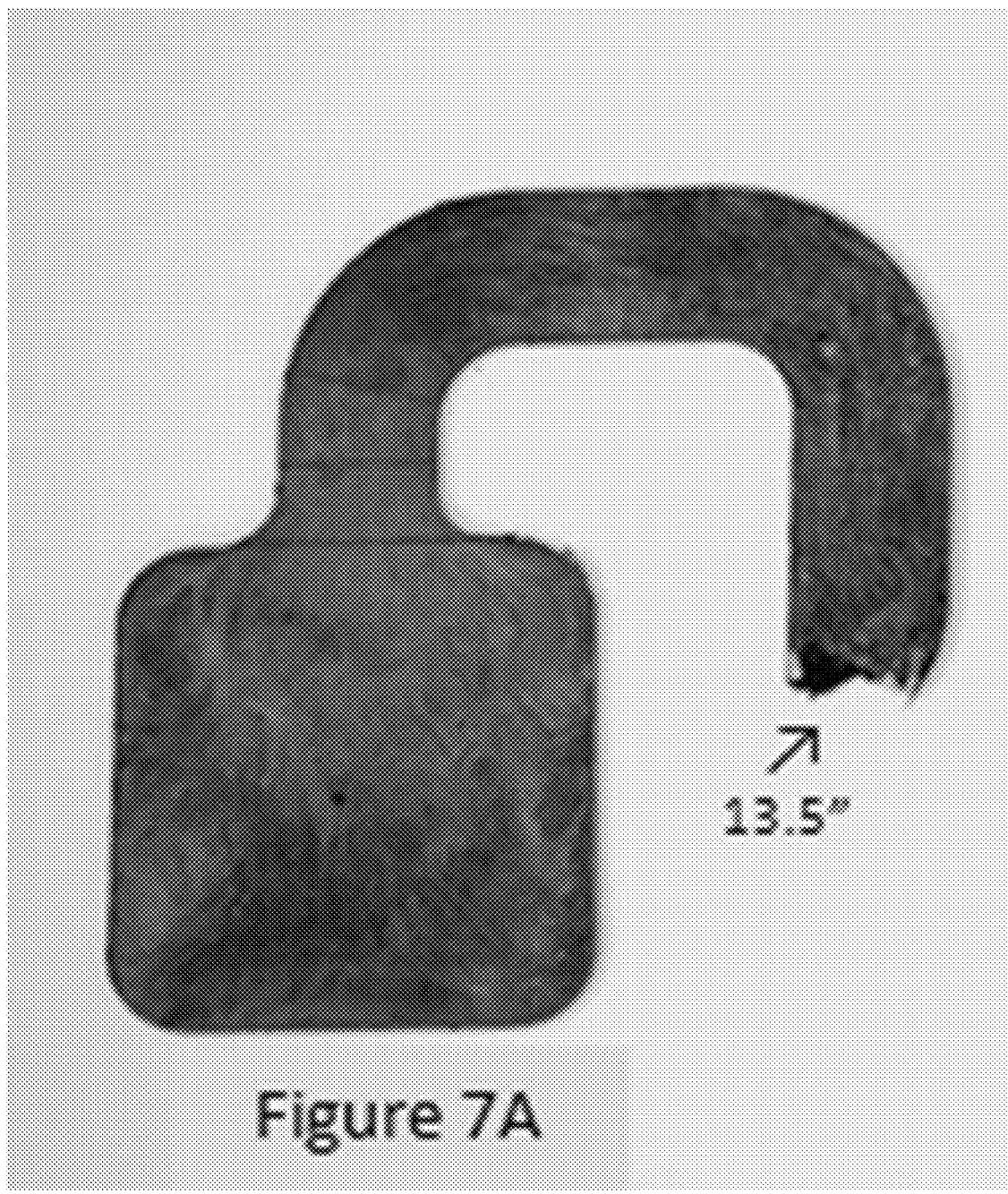
FIGS. 7A and 7B are photographs of SMC composites made using a spiral flow mold, 7A containing an unfilled resin system and 7B containing a filled resin system.
Figure 7B:
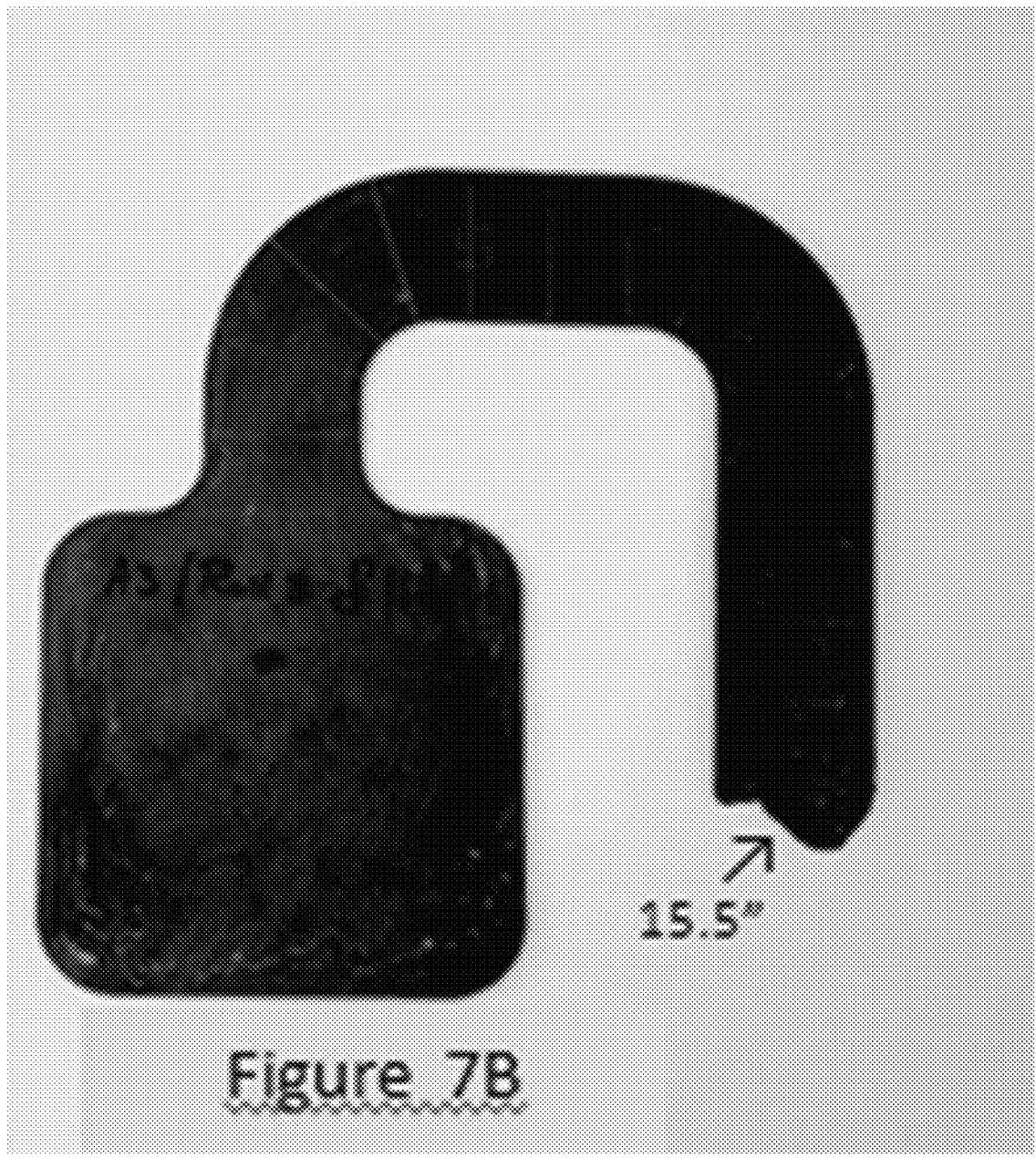

As shown in FIGS. 7A and 7B, the filled system with higher viscosity provides additional force for pushing the fiber network and thereby increased flow. In this example, the increase is measured by additional 2.0 inches of matrix flow.

It was found that the open and uniform network morphology of the carbon fiber mats provided very easy impregnation with polymeric or other composite matrix materials and easy wetting of all individual filaments. While not desiring to be bound by theory, it is believed that the lack of permanent adhesive bonds locking carbon fibers in place combined with increased flexibility of the multi-component non-adhesive binder fibers contribute to improved flow of both the carbon fibers and resin impregnate under molding conditions.

It is generally accepted that surface smoothness is related to the resin formulation and add-on percentage. However, binder levels as well as the choice of binders to control resin flow properties also can enhance surface features of the final product.

Sheet Molding Compound (SMC)

The carbon fiber mat of the present invention including the open and uniform network morphology allows for very easy impregnation with polymeric or other composite matrix materials and easy wetting of all individual filaments. The material has applications in automotive, aerospace, and other industrial or commercial applications in which a low cost, high strength material is desired.

Compression Molding with Thermoplastics

The carbon fiber mat of the present invention combined with interwoven thermoplastic fibers, interleaved sheet stock, or impregnated resin produces a part with uniform wetting out of the individual filaments and a fully impregnated substrate. The open morphology of the mat provides an open pathway for the high viscosity resin to fully impregnate the laminate stack producing a consistent carbon/thermoplastic material.

The carbon/thermoplastic mat product has applications in high volume, non-structural applications within the automotive, aerospace, and other industrial or commercial applications seeking a higher strength, lower cost replacement to existing thermoplastic materials Nonwoven substrate mats made in accordance with the present invention can include a single homogeneous layer of fibers or may include a stratified or layered construction. For example, the wet-laid mat construction may include two or three layers of fibers. Each layer may have a different fiber composition using a divided papermaking headbox as is known. Each of the fiber layers from the divided headbox includes a dilute aqueous suspension of fibers. The particular fibers contained in each layer generally depend upon the construction being formed and the desired results. In one aspect, for example, the middle layer may contain different concentrations of fibers in combination with the carbon fibers while the outer layers, on the other hand, can contain more binder fibers.

Infusion Media—Vacuum Infusion and Resin Transfer Molding (RTM)

The carbon fiber mat of the present invention interleaved or combined with standard woven or non-woven materials acting as a structural infusion media, significantly increases the rates of infusion and provides added mechanical benefit over a standard laminate. The time required to infuse large scale applications is an important variable to be considered when evaluating the profitability of a project.

Greatly reducing such times, leads to greater throughput of parts, higher volumes, and lower operating costs. The present mat products have applications in large scale VARTM or RTM parts where infusion rates are an important variable in the cost of a project. Such applications include but are not limited to wind turbine blades, large yachts, and within the commercial boating industry.

Example 11

Flowability of Thermoplastic Materials

It appeared there was a significant flow difference of consolidated mats of 75 gsm when compared to 300 gsm, as indicated in FIGS. 8A and 8B. In order to ensure repeatability, flowability was repeated in a number of mats.

Flow characterization of consolidated mats was repeated using 75 and 300 gsm substrates with 40% 25 mm carbon fibers+60% 7 dpf 6 mm Polypropylene fibers with 3% PVOH VPB 105-2 4 mm fibers. FIGS. 8A and 8B compare flows for these resulting substrates. It takes more time to get to 'stop limit' when molding is done of mats with lower basis weight (75 gsm) compared to higher basis weight (300 gsm). In general, there is a slight increase in flowability of heavier basis weight mats.

The description of this example is as follows:

Using 40% 25 mm carbon fiber, 60% 7 dpf 6 mm polypropylene fibers and 3% VPB 105-2 4 mm PVOH fibers, handsheets targeting 75 and 300 gsm were prepared. 25 mm carbon fibers, received from Zoltek in 50K, were initially dispersed with a dual polymer surfactant and dispersant systems. The handsheets were then consolidated in a hot press as follows:

Sheets were cut 5" square and stacked to weigh approximately 50 grams each of 75 gsm and 300 gsm. Using steel plates on top and bottom, this stack of sheets were pressed in a hot press set at 325° F. under 1000 psi loading. It was held in this condition for 30 minutes. Before opening the press, temperature was dropped below 150° F.

These consolidated mats were tested for flow characteristics using a Spiral Flow System at Reichhold, RTP, NC. The platens were heated to 349° F. Approximately 100 grams of consolidated materials were placed in the mold and molded at 1000 psi. Molding was done at 1000 psi and held at molding temperature 348-349° F. for 10 minutes. The mold is cooled below 150° F. before opening. The time it took to 'stop' was recorded.

As shown in FIGS. 9A-9C and 10A-10B, it appears that only a slightly higher flow was observed in 300 gsm consolidated mats. However, there was significant difference in time to reach to 'stop'. Whereas it took 4.3 minutes to get to 'stop' with 300 gsm mats, time to reach 'stop' was 6.5 minutes in 75 gsm indicating easier flow with heavier mats. As such, there may be a slight advantage in making mats heavier to achieve higher flow in a consolidated mat.

While the invention has been explained in relation to various embodiments, it is to be understood that various modifications thereof will be apparent to those skilled in the art upon reading the specification. The features of the various embodiments of the articles described herein may be combined within an article. Therefore, it is to be understood that the invention described herein is intended to cover such modifications as fall within the scope of the appended claims.

What is claimed:

1. A method of making a molded non-woven carbon fiber containing mat, the method comprising:
    mixing an aqueous slurry comprising carbon fibers and binder fibers, wherein the aqueous slurry comprises the binder fibers in an amount of about 1% to about 10% by weight based on the weight of the slurry, and wherein the binder fibers comprising non-adhesive thermoplastic multi-component fibers;
    depositing the slurry onto a porous forming surface to form a wet-laid mat supported by the porous forming surface;
    removing water from the wet-laid mat through the porous forming surface;
    activating the binder fibers such that a surface component of the binder fibers forms a melt attachment directly to the carbon fibers;
    further drying the wet-laid mat to form a non-woven carbon fiber mat having an open network of carbon fibers;
    impregnating the dried, non-woven carbon fiber mat with a resin; and
    subjecting the impregnated non-woven carbon fiber mat to vacuum assisted resin transfer conditions in a mold to cause mold flow and re-melt the surface component of the binder fiber to form the molded non-woven carbon fiber containing mat.

2. The method as in claim wherein the resin is compatible with the surface component of the binder fibers.

3. The method as claim 1, wherein the non-woven carbon mat has an open network of carbon fibers maintained in substantial alignment by the activated binder fibers.

4. The method as in claim 1, wherein activating the binder fibers comprises:
    allowing absorption of water by the binder fibers; and
    thereafter, drying at a temperature of about 60° C. or higher such that the binder fibers dissolve and work as binder.

5. The method as in claim 1, wherein the non-adhesive thermoplastic multi-component fibers comprise core-sheath bi-component fibers.

6. The method as in claim 5, wherein the bi-component fibers comprise a first polymeric material having a first melting temperature and a second polymeric material having a second melting temperature, and wherein the first melting temperature is less than the second melting temperature.

7. The method as in claim 6, wherein the bi-component fibers are define a sheath and a core, wherein the sheath comprises the first polymeric material, and wherein the core comprises the second polymeric material.

8. The method as in claim 7, wherein activating the binder fibers such that the binder fibers form a melt attachment to the carbon fibers comprises:
    heating the binder fibers to a temperature at or above the first melting temperature sufficient to melt the first polymeric material of the sheath, but less than the second melting temperature of the second polymeric material of the core.

9. The method as in claim 5, wherein the first polymeric material comprises a first polyester, and wherein the second polymeric material comprises a second polyester, the first polyester being different than the second polyester.

10. The method as in claim 9, wherein the first polyester has a melt point of about 100° C. to about 225° C., and wherein the second polyester has a melt point temperature of about 250° C. or greater.

11. The method as in claim 1, wherein the binder fibers comprise core-sheath bi-component fibers having a first polymeric material having a first melting temperature and a second polymeric material having a second melting temperature, wherein the sheath comprises the first polymeric material, and wherein the core comprises the second polymeric material, and
wherein the resin comprises a polymer compatible with the first polymeric material.

12. The method as in claim 11, wherein the binder fibers comprise CoPET/PET bicomponent fibers, and wherein the resin includes polyester resin.

13. The method as in claim 1, wherein the aqueous slurry comprises the carbon fibers in an amount of about 0.2% to about 10% by weight based on the weight of the slurry of a plurality of carbon fibers.

14. The method as in claim 1, wherein the aqueous slurry further comprises a viscosity modifier.

15. The method as in claim 14, wherein the viscosity modifier comprises a two component system of surfactant and flocculant.

16. The method as in claim 1, wherein activating the binder fibers includes infra-red heating of the wet-laid mat.

17. The method as in claim 1, further comprising:
combining multiple impregnated non-woven carbon fiber mats as layers prior to subjecting them to the conditions for molding.

18. The method as in claim 1, wherein the resin comprises a thermoset resin.

19. The method as in claim 18, wherein the thermoset resin comprises an epoxy compound, a vinyl ester compound, or an unsaturated polyester resin.

20. The method as in claim 1, wherein the resin is present within the molded non-woven carbon fiber containing mat in a range of about 30% to about 55% based on the volume of the impregnated mat.

* * * * *